United States Patent [19]

Penning et al.

[11] 4,452,949

[45] Jun. 5, 1984

[54] WATER-SOLUBLE PARTIALLY SAPONIFIED COPOLYMERS BASED ON VINYL ACETATE AND METHYL ACRYLATE AND THEIR USE FOR DELAYING THE POLYMERIZATION OF STYRENE

[75] Inventors: Ernst Penning, Ludwigshafen; Bernd Stanger, Dudenhofen; Alfred Mueller, Biblis, all of Fed. Rep. of Germany

[73] Assignee: BASF Aktiengesellschaft, Ludwigshafen, Fed. Rep. of Germany

[21] Appl. No.: 371,961

[22] Filed: Apr. 26, 1982

[30] Foreign Application Priority Data

May 2, 1981 [DE] Fed. Rep. of Germany ....... 3117395

[51] Int. Cl.$^3$ .................... C08F 8/12; C08F 228/02
[52] U.S. Cl. ................... 525/328.2; 525/369; 526/202; 526/287
[58] Field of Search ............... 525/60, 62, 328.2, 369; 526/287

[56] References Cited

U.S. PATENT DOCUMENTS 4,073,995  2/1978  Baatz ................... 526/287
4,200,563  4/1980  Komiya ................. 526/287

*Primary Examiner*—C. A. Henderson
*Attorney, Agent, or Firm*—Joseph D. Michaels

[57] ABSTRACT

By emulsion polymerization of vinyl acetate, methylacrylate, acrylic acid, monoolefinically unsaturated sulfoalkyl esters or amides and vinyl sulfonate and partial saponification of the resultant copolymer emulsion, an aqueous solution of a copolymer is obtained which greatly delays the polymerization of styrene in aqueous media.

3 Claims, No Drawings

WATER-SOLUBLE PARTIALLY SAPONIFIED COPOLYMERS BASED ON VINYL ACETATE AND METHYL ACRYLATE AND THEIR USE FOR DELAYING THE POLYMERIZATION OF STYRENE

BACKGROUND OF THE INVENTION

1. Field of the Invention

This invention relates to copolymers based on vinyl acetate and methyl acrylate produced by copolymerization followed by partial saponification while dissolving the copolymer in an alkali base.

2. Description of the Prior Art

It is known that vinyl acetate and methylacrylate can be polymerized in aqueous emulsion by addition of polymerization initiators and emulsion agents at increased temperatures such as 50° C. to 80° C. Other monomers such as acrylic acid may also be used. Copolymer dispersions are obtained which, depending upon their composition, can be used as paint, wood adhesive or additives for hydraulic binders. Such copolymers, as aqueous emulsions, are relatively easily saponified causing a detrimental effect when used as additives in hydraulic binders such as cement. The saponification of polyvinyl acetate dispersions results in aqueous solutions of polyvinyl alcohol and/or partially saponified products which may be used as protective colloids particularly in the emulsion polymerization of vinyl acetate. They do not have a delaying effect upon the emulsion polymerization.

SUMMARY OF THE INVENTION

This invention relates to a water-soluble, partially saponified copolymer based on vinyl acetate and methyl acrylate which is produced by
(A) copolymerization of
 (a) 40 to 65 percent by weight of vinyl acetate,
 (b) 55 to 30 percent by weight of methyl acrylate,
 (c) 4 to 8 percent by weight of acrylic acid,
 (d) 0.2 to 10 percent by weight of monoolefinically unsaturated sulfoalkyl esters and/or amides and
 (e) 0.1 to 1 percent by weight of sodium vinyl sulfonate in water in the presence of known polymerization initiators and emulsifiers in known amounts at temperatures of 50° C. to 90° C.,
(B) partial saponification of the copolymer emulsion resulting from step (A) while dissolving the copolymer by adding 4 to 7 percent by weight relative to the copolymer of an alkali base at temperatures of 20° C. to 50° C. and in a preferred embodiment
(C) evaporation of water.

Surprisingly, the water-soluble, partly saponified copolymer greatly delays the polymerization of styrene in aqueous media such as aqueous emulsion, but does not greatly delay polymerization of acrylates such as butylacrylate or methylacrylate.

DESCRIPTION OF THE PREFERRED EMBODIMENTS

The emulsion copolymerization of vinyl acetate with the other monomers can be carried out in a known manner, preferably at temperatures of 60° C. to 90° C. and in accordance with the monomer feed process or the emulsion feed process. The amount of monomers and aqueous phase are generally selected in such a manner that the emulsion copolymerization results in a 30 to 50 percent copolymer dispersion. The amounts used preferably lie within the ranges of 40 to 65, preferably 45 to 55 percent by weight vinyl acetate, 30 to 55, preferably 40 to 50 percent by weight methylacrylate, 4 to 8, preferably 4.5 to 6 percent by weight acrylic acid, 0.2 to 10, preferably 0.4 to 3 percent by weight, sulfoesters and/or amides and 0.1 to 1, preferably 0.2 to 0.5 percent by weight sodium vinyl sulfonate whereby the total of these monomers adds up to 100 percent by weight. The sulfoesters and/or amides are known monomers. Preferably used are 2-sulfoethylacrylate and -methacrylate and 2-sulfo-1-propyl-acrylate and -methacrylate, 2-sulfo-1-butylacrylate and -methacrylate, 2-methyl-2-sulfo-1-propylacrylate, 3-methoxy-2-sulfo-1-propylacrylate, 3-sulfo-1-propylacrylate and -methacrylate, 4-sulfo-1-butylacrylate, N-2-sulfoethyl-acrylamide and -methacrylamide and 2-acrylamido-2-methylpropane sulfonic acid.

Preferably used for the emulsion copolymerization are water-soluble peroxides such as hydrogen peroxide, potassium persulfate, sodium persulfate or ammonium persulfate, as well as sodium perborate or, when temperatures of 30° C. to 60° C. are to be employed, redox initiators such as mixtures of potassium persulfate and sodium dithionite or sodium hydrogen sulfite in an amount from 0.1 to 2, preferably 0.2 to 1 percent by weight relative to the amount of the monomers.

The polymerization may be carried out either without emulsifiers or with the known emulsifiers such as sodium lauryl sulfate or $C_{13}$–$C_{17}$ alkylsulfonates (sodium salts). The emulsifier quantity usually varies between 0.2 and 1 percent by weight, preferably between 0.2 and 0.5 percent by weight, relative to the monomers. In addition to this, regulators such as dodecylmercaptan or diisopropylxanthic disulfide may be used in quantities of 0.5 percent by weight relative to the amount of monomers. In this case, an aqueous dispersion of a copolymer is obtained which generally has a K-value (in accordance with DIN 53,726) of 15 to 100, with K-values of 15 to 25 being preferred, since the subsequent partial saponification of these copolymers results in aqueous solutions with particularly favorably viscosities.

After cooling to a temperature of 40° C., preferably about 30° C., 4 to 7, preferably 4.2 to 5, percent by weight, relative to the copolymer, alkali is added to the copolymer emulsion. The alkali is preferably added in form of its aqueous solution, preferably an aqueous sodium hydroxide solution having a concentration of 1 to 5, preferably 1.5 to 2.5, percent by weight. Potassium hydroxide solution may also be used. It is advantageous to agitate the mixture during the partial saponification. The partial saponification during which the copolymer goes into solution is completed after approximately 1 hour. The resultant aqueous solution of the partially saponified copolymer may be used as such.

However, the water of the resultant solution may also be evaporated for instance by spray drying in a thin film evaporator or by directing nitrogen through the solution under reduced pressure. After evaporating the water, a yellowish powdery polymer is obtained which dissolves clearly in water. Its softening point (measured in accordance with DIN 53,180) is generally located between 150° C. and 170° C.

The water-soluble partially saponified copolymer greatly delays the polymerization of styrene in aqueous emulsion. Essentially no reduction of the polymerization rate takes place in aqueous emulsions of acrylates such a butylacrylate or methylacrylate. The styrene polymerization is delayed primarily in acid media.

With the aid of the water-soluble partially saponified copolymers according to this invention, it is thus possible to inhibit the polymerization of styrene in aqueous media on a selected basis. On the other hand, the familiar commonly used inhibitors affect the commonly used olefinically unsaturated monomers in this same manner, that is, they are unspecific, that is, non-selective.

The parts and percentages used in the following examples are relative to weight. The K-values stated in these examples were determined in accordance with DIN 53,726.

EXAMPLE 1

(a) A mixture of 6240 parts water, 30 parts potassium persulfate, 18 parts sodium pyrophosphate, 30 parts 2-acrylamido-2-methyl-propane sulfonic acid and 48 parts sodium vinyl sulfonate was placed in a polymerization vessel. The mixture was heated to a temperature from 80° C. to 83° C. Beginning at 78° C., a mixture of 2685 parts methylacrylate, 2985 parts vinyl acetate, 309.3 parts of acrylic acid and 30 parts of t-dodecylmercaptan (1) and a solution of 60 parts potassium persulfate in 2940 parts of water (2) were fed into the vessel from separate containers. Feed 1 was added to the polymerization vessel in 2 hours and feed 2 was introduced into the polymerization vessel in 2.5 hours. After feed was completed, the temperature of the reaction mixture was increased to 90° C. and the mixture was maintained at 90° C. for 1.5 hours. The result was an aqueous dispersion of a copolymer having a K-value of 20. The dispersion was allowed to cool to 30° C. and a solution of 270 parts sodium hydroxide in 15,942 parts of water, fed into the vessel within a period of 1 hour. Following this, the mixture was allowed to react for 1 hour. A 20 percent aqueous solution of a partially saponified vinyl acetate-methylacrylate copolymer was obtained which had a pH value of 8.25 and a viscosity of approximately 24 mPa.s.

The solution may be used as such for delaying the emulsion polymerization of styrene. After spray drying, a light yellow powder having a softening point of 150° C. to 170° C. was obtained which dissolved clearly in water.

(b) One proceeded as under (a) but did not use any t-dodecylmercaptan. This resulted in an aqueous dispersion of the vinyl acetate-methylacrylate copolymer having a K-value of 50. The partial saponification resulted in an aqueous solution having a viscosity of 86 mPa.s which delayed the emulsion polymerization of styrene.

(c) One proceeded as under (a) but used only 18 parts of potassium persulfate in the original mixture and only 6 parts of t-dodecylmercaptan in the feed. This resulted in an aqueous dispersion of the vinyl acetate-methylacrylate copolymer having a K-value of 100 from which an aqueous solution with a viscosity of 860 mPa.s was obtained after partial saponification. This solution also was suited for delaying the polymerization of styrene in aqueous emulsion.

EXAMPLES OF USES (a) Emulsion polymerization of styrene

An emulsion of 300 parts styrene in 650 parts of water containing 6.7 parts of sodium laurylsulfate and 0.9 parts of sodium pyrophosphate and 0.15 parts of sodium persulfate was placed in a polymerization vessel while stirring and the mixture was heated. Starting with a temperature of 50° C., a solution of 4.35 parts of sodium persulfate in 58 parts of water was slowly added which was then totally introduced at 85° C. to 90° C. within a period of 1 hour.

After cooling, a 30 percent polystyrene dispersion was obtained.

If one proceeds as stated above but added 0.01 part (solid on solid) of the partially saponified copolymer obtained in accordance with Example 1 (a) in the vessel, an 8.6 percent polystyrene dispersion only (conversion 28.7 percent) was obtained with otherwise equal conditions.

Larger quantities of the partially saponified copolymer did not further reduce the conversion of the styrene.

(b) Emulsion polymerization of n-butylacrylate

One proceeded as listed under (a) but replaced the styrene by an equal amount of n-butylacrylate. In addition to this, a solution of 1.7 parts sodium persulfate in 24 parts of water was used as feed 1 and the polymerization temperature was kept at 82° C. to 85° C. This resulted in an approximately 31 percent polyacrylate dispersion. If 0.03 and/or 0.031 parts of the water-soluble partially saponified copolymer of Example 1 (a) was added to the initial polymerization mixture, dispersions with a solids content of 28.7 to 30.3 percent was obtained with reactions of 92 to 97.1 percent. With increasing quantities of the partially saponified water-soluble copolymer, the coagulate content increased which was eliminated by also using the commonly applied protective colloids.

(c) Emulsion polymerization of methylacrylate

One proceeded as stated under examples for application (a) but replaced the styrene with the same quantity of methylacrylate and a feed 1 consisting of a solution of 1.7 parts of sodium persulfate in 24 parts of water. The polymerization temperature was 70° C. to 75° C. With a conversion of 94.5 percent, a 29.1 percent polymethylacrylate dispersion was obtained. If 0.03 and/or 0.01 part (solid on solid) of the water-soluble partially saponified copolymer of Example 1 (a) was added to the initial mixture, the conversion was 90.6 to 92.2 percent and a 27.9 and/or 28.4 percent polymethylacrylate dispersion was obtained. If more than 0.05 part of the water-soluble partially saponified copolymer of Example 1 (a) was added to the initial mixture, a pronounced coagulate formation took place which could be prevented by also using commonly applied protective colloids.

The comparison of the use examples of (a) through (c) shows that the water-soluble partially saponified copolymer of Example 1 (a) greatly inhibited the emulsion polymerization of styrene but did essentially not delay the emulsion polymerization of n-butylacrylate or methylacrylate.

The embodiments of the invention in which an exclusive privilege or property is claimed are defined as follows:

1. A water-soluble, partially saponified copolymer produced by
   (A) copolymerization of
      (a) 45 to 55 percent by weight of vinyl acetate,
      (b) 40 to 50 percent by weight of methyl acrylate,
      (c) 4 to 8 percent by weight of acrylic acid
      (d) 0.2 to 10 percent by weight of a monoolefinically unsaturated sulfoalkyl esters or amides, and
      (e) 0.1 to 1 percent by weight of sodium vinylsulfonate, in water in the presence of polymerization initiators and emulsifiers at a temperature of 50° C. to 90° C.

(B) partial saponification of the copolymer emulsion resulting from (A) by dissolving the copolymer by adding 4 to 7 percent by weight relative to the copolymer of an alkali hydroxide at a temperature of 20° C. to 50° C.

2. The partially saponified copolymer of claim 1 produced by the steps of claim 1 and the following additional step
   (C) evaporation of the water.

3. The partially saponified copolymer of claim 1 or 2 wherein 45 to 55 percent by weight vinyl acetate, 50 to 40 percent by weight methylacrylate, 4.5 to 6 percent by weight acrylic acid, 0.4 to 3 percent by weight sulfoesters and/or amides and 0.2 to 0.5 percent by weight sodium vinyl sulfonate are copolymerized in step (A).

* * * * *